US010999761B2

United States Patent
He et al.

(10) Patent No.: US 10,999,761 B2
(45) Date of Patent: May 4, 2021

(54) METHODS TO DETERMINE A HYBRID AUTOMATIC REPEAT REQUEST ACKNOWLEDGEMENT (HARQ-ACK) CODEBOOK IN NEW RADIO (NR) SYSTEMS

(71) Applicant: Apple Inc., Cupertino, CA (US)

(72) Inventors: Hong He, Beijing (CN); Gang Xiong, Beaverton, OR (US); Debdeep Chatterjee, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 16/409,245

(22) Filed: May 10, 2019

(65) Prior Publication Data

US 2019/0268803 A1 Aug. 29, 2019

Related U.S. Application Data

(60) Provisional application No. 62/670,638, filed on May 11, 2018.

(51) Int. Cl.
*H04W 72/04* (2009.01)
*H04W 72/12* (2009.01)
(Continued)

(52) U.S. Cl.
CPC ........... *H04W 28/04* (2013.01); *H04L 1/1816* (2013.01); *H04L 5/001* (2013.01); *H04L 5/0055* (2013.01);
(Continued)

(58) Field of Classification Search
CPC ........... H04W 72/042; H04W 72/0413; H04W 24/02; H04W 24/10; H04W 72/0406; H04W 4/06; H04W 52/02; H04W 72/0446; H04W 72/046; H04W 72/1205; H04L 5/0055; H04L 1/1812; H04L 1/1861; H04L 5/0053; H04L 1/1854; H04L 1/1864; H04L 5/0035; H04L 5/0057; H04L 5/0094; H04L 5/14; H04B 7/0417; H04B 7/0469; H04B 7/024; H04B 7/0452; H04B 7/046; H04B 7/0478
See application file for complete search history.

(56) References Cited

U.S. PATENT DOCUMENTS 8,885,526 B2 * 11/2014 He .................. H04W 16/04
370/280
9,282,571 B2 * 3/2016 Khoryaev ............. H04L 5/0051
(Continued)

*Primary Examiner* — Sai Aung
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. The UE may receive radio resource control (RRC) signaling that configures reception of a plurality of physical downlink shared channels (PDSCHs) in a frame. The frame may comprise multiple slots, including one or more downlink slots and one or more uplink slots. The UE may determine a subset of the PDSCHs, such that for each of the PDSCHs of the subset, corresponding consecutive slots do not overlap the uplink slots. The UE may set a number of bits of a hybrid automatic repeat request acknowledgement (HARQ-ACK) codebook equal to a number of PDSCHs in the determined subset.

20 Claims, 14 Drawing Sheets

(51) Int. Cl.
*H04L 1/18* (2006.01)
*H04L 5/14* (2006.01)
*H04W 28/04* (2009.01)
*H04L 5/00* (2006.01)
*H04W 88/02* (2009.01)

(52) U.S. Cl.
CPC ....... *H04L 5/1469* (2013.01); *H04W 72/1273* (2013.01); *H04W 72/1289* (2013.01); *H04W 88/02* (2013.01)

(56) References Cited

U.S. PATENT DOCUMENTS

| | | | |
|---|---|---|---|
| 9,362,998 B2* | 6/2016 | He | H04W 36/0083 |
| 9,451,604 B2* | 9/2016 | Xue | H04W 72/0413 |
| 2017/0079012 A1* | 3/2017 | Rashid | H04W 72/048 |
| 2019/0363840 A1* | 11/2019 | Wang | H04L 1/1861 |
| 2020/0022175 A1* | 1/2020 | Xiong | H04L 5/0053 |
| 2020/0059327 A1* | 2/2020 | Kini | H04L 1/1812 |
| 2020/0084789 A1* | 3/2020 | Wang | H04L 1/1812 |

\* cited by examiner

1100

- Set $M_{A,c} = 0$ ($M_{A,c}$ denotes the number of occasions for candidates PDSCH receptions or SPS PDSCH)
- Set $K_{1,c}$ to the cardinality of set $K_1$
- Set $F$ to the value of slot aggregation factor of PDSCH provided by higher layers
- Set $k = 0$ — index of slot timing values $K_{1,k}$ in set $K_1 = \{K_{1,k}\}$, $0 \leq k < K_{1,c}, K_{1,k} < K_{1,k+1}$, for serving cell c
- Set $m = 0$ — the smallest last slot index determined by DL slot aggregation factor F and K1 value

- While $k < K_{1,c}$
  - If slot n is after a slot for an active DL BWP change on serving cell c or an active UL BWP change on the PCell and any slot with the set from slot $n - K_{1,k} - (F - 1)$ to slot $n - K_{1,k}$ is before the slot for the active DL BWP change on serving cell c or the active UL BWP change on the PCell
    - $K_1 = K1 \setminus K_{1,k}$; — subtracting the k from the set of K1
  - else
    - If the UE is provided by higher layer TDD semi-static UL-DL configuration parameter and for slot sets from slot $n - K_{1,k} - (F - 1)$ to slot $n - K_{1,k}$ at least one OFDM symbol of the PDSCH time resource derived is configured as UL.
      - $K_1 = K1 \setminus K_{1,k}$; — subtracting the k from the set of K1
    - else
      - If $(m == 0)$ or $((n - K_{1,k}) < m)$
        - $M_{A,c} = M_{A,c} \cup \{K_{1,k}\}$; — K1 value of occasion for candidate multi-slot PDSCH reception
        - $m = n - K_{1,k} - (F - 1)$; — Set m to the largest slot index among all PDSCH candidates of selected occasion
      - Else
        - $K_1 = K1 \setminus K_{1,k}$;
      - End if
    - end if
  - end if
  - k=k+1;
- end while

```
>   Set m to the smallest last slot index determined by DL slot aggregation factor K1 value among
    all the PDSCH candidates
>   Set $k = 0$ — index of slot timing values $K_{1,k}$ in set $K_1 = \{K_{1,k}\}$, $0 \leq k < K_{1,c}, K_{1,k} > K_{1,k+1}$, for
    serving cell c
>   Set j=0
>
>   While $k < K_{1,c}$
    ......
                >   If $\left((j = 0) \text{ or } (n - K_{1,k} - (r - 1)) > m\right)$
                        >   $M_{A,c} = M_{A,c} \cup \{K_{1,k}\}$; —— K1 value of occasion for candidate
                            multi-slot PDSCH reception
                        >   $m = n - K_{1,k}$; ——Set m to the largest slot index among all
                            PDSCH candidates of selected occasion;
                        >   $j = j + 1$;
                >   Else
                        >   $K_1 = K_1 \setminus K_{1,k}$;
                >   End if
        >   end if
    -   end if
    -   k=k+1;
end while
```

FIG. 12

1300

METHODS TO DETERMINE A HYBRID AUTOMATIC REPEAT REQUEST ACKNOWLEDGEMENT (HARQ-ACK) CODEBOOK IN NEW RADIO (NR) SYSTEMS

PRIORITY CLAIM

This application claims priority under 35 USC 119(e) to U.S. Provisional Patent Application Ser. No. 62/670,638, filed May 11, 2018 [reference number AB1514-Z (1884.780PRV)], which is incorporated herein by reference in its entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to hybrid automatic repeat request (HARQ). Some embodiments relate to HARQ acknowledgement (HARQ-ACK). Some embodiments relate to HARQ-ACK codebooks.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

FIG. 11 illustrates example operations in accordance with some embodiments;
FIG. 12 illustrates example operations in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
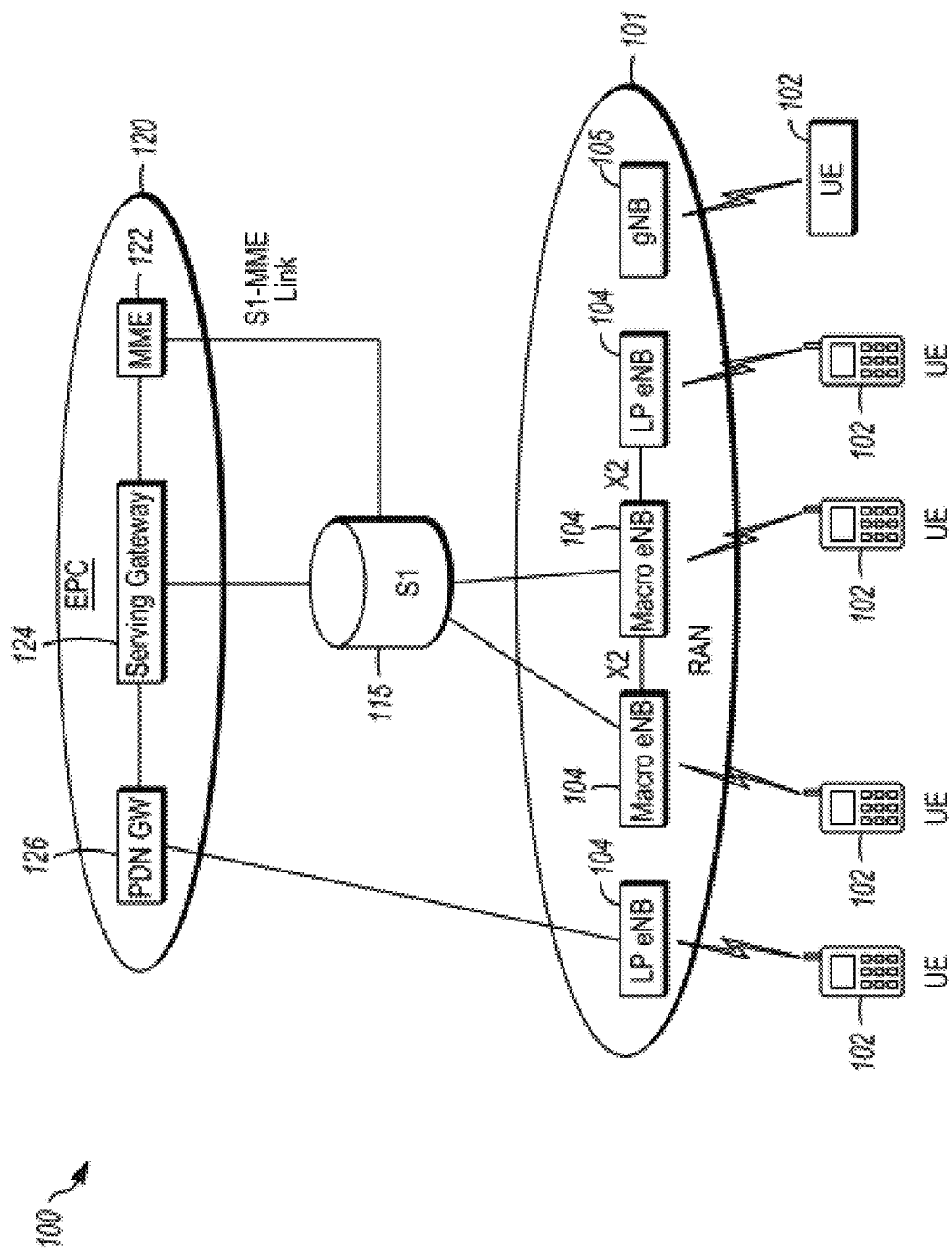
FIG. 1A is a functional diagram of an example network in accordance with some embodiments.
Figure 1B:
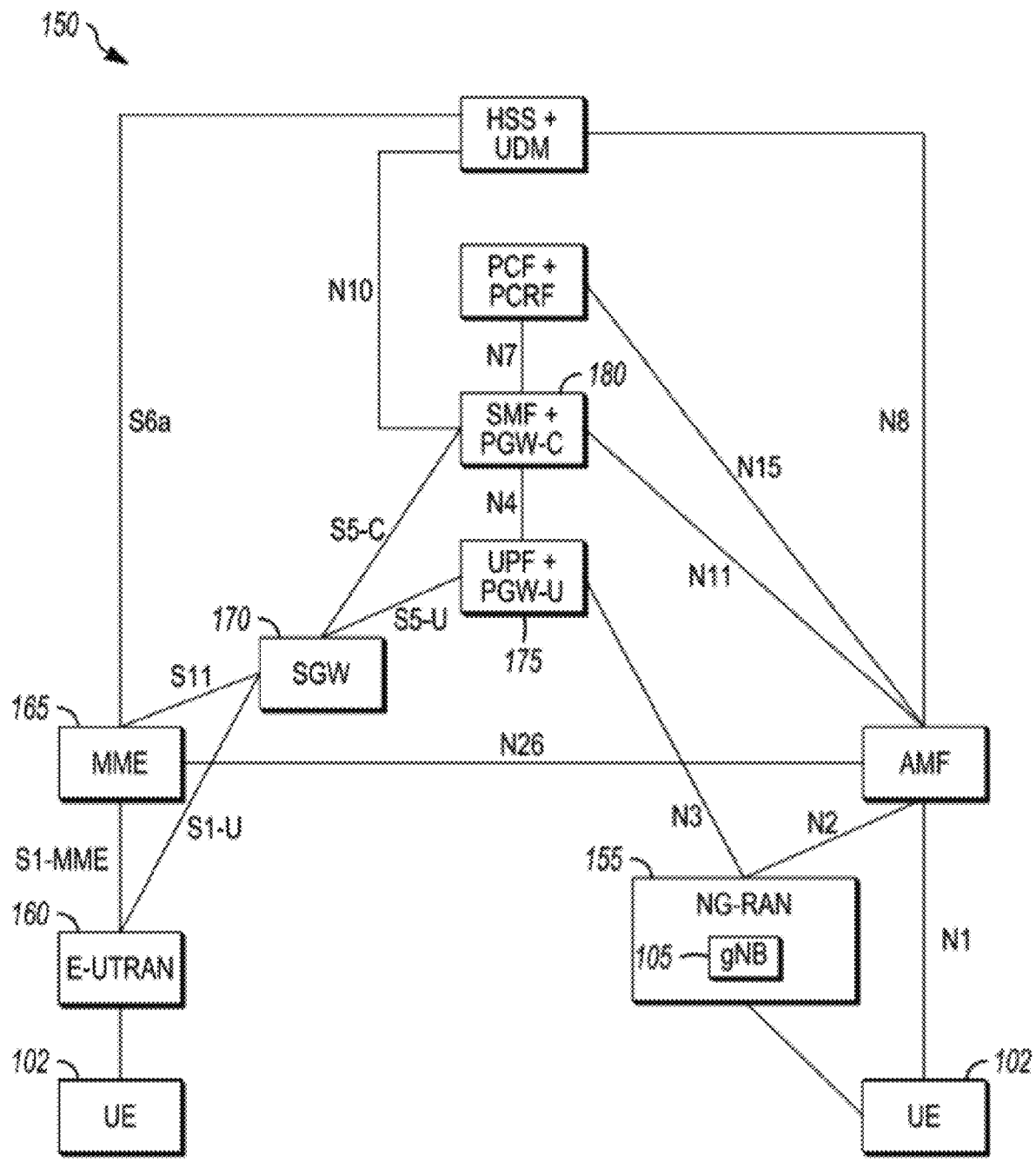
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
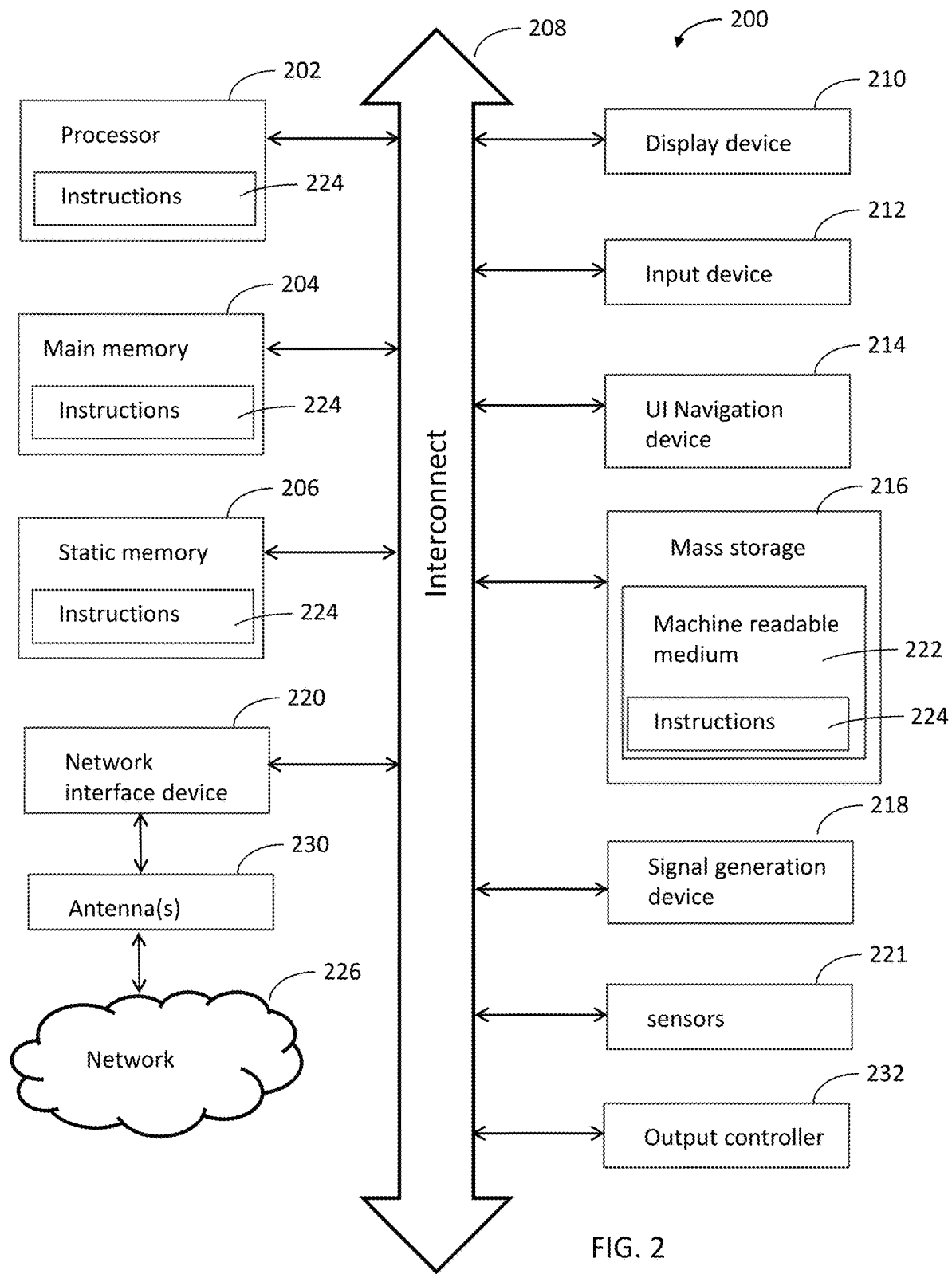
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
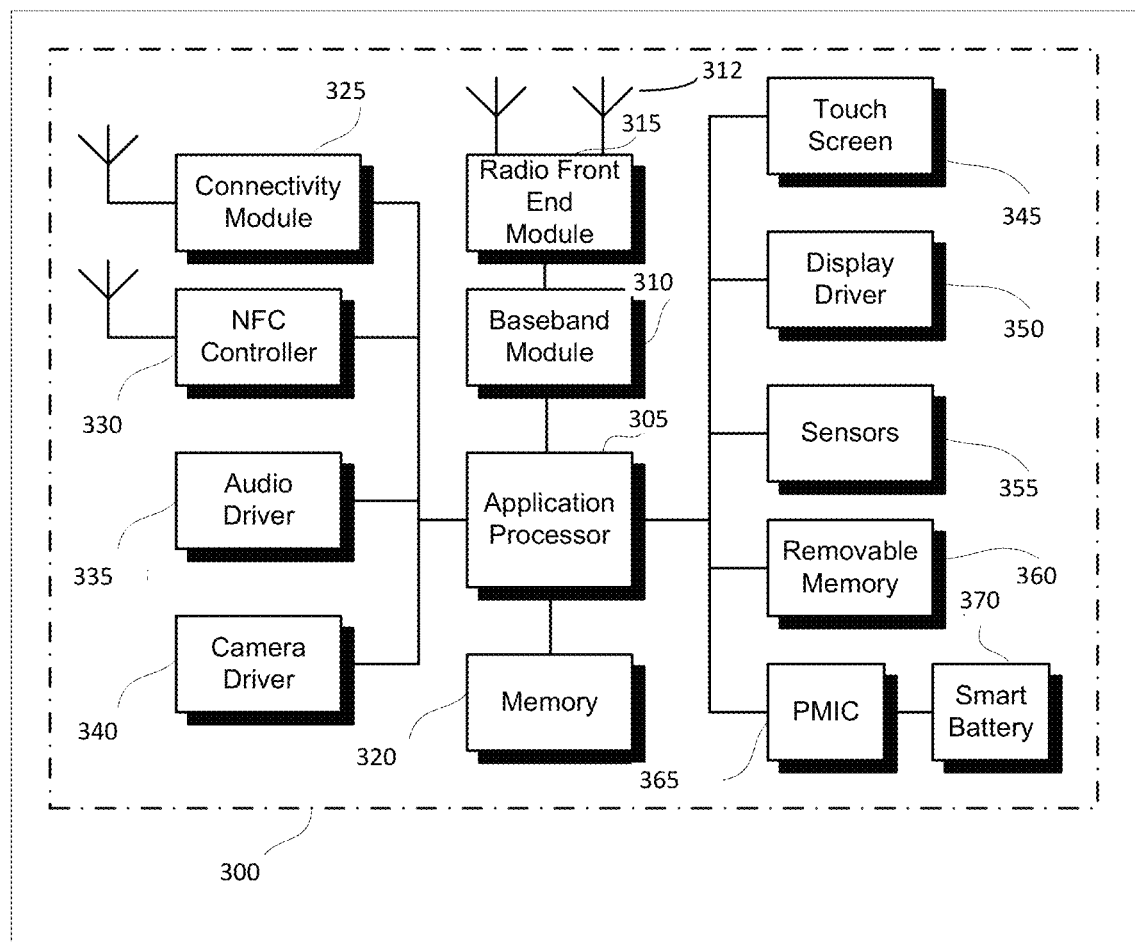
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
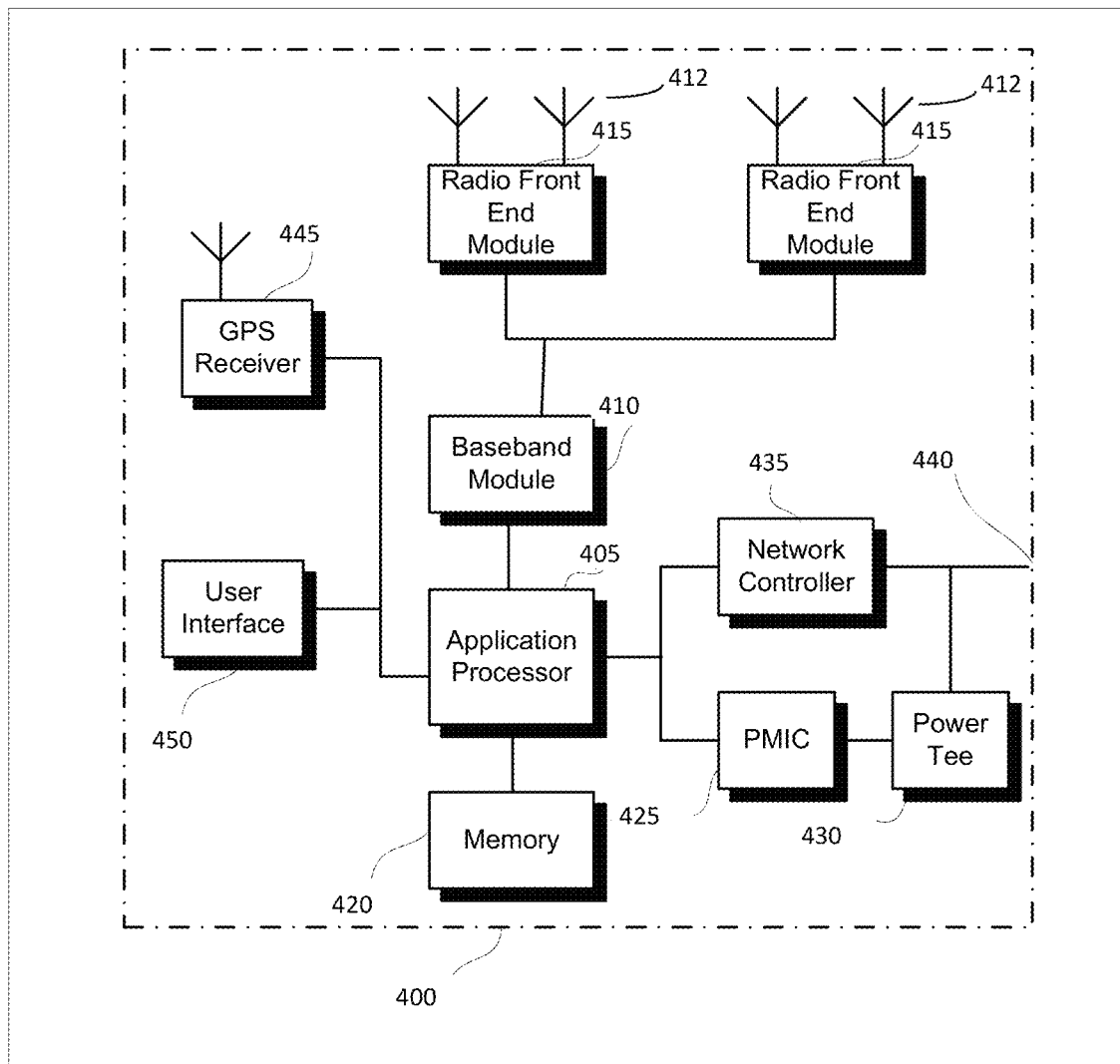
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
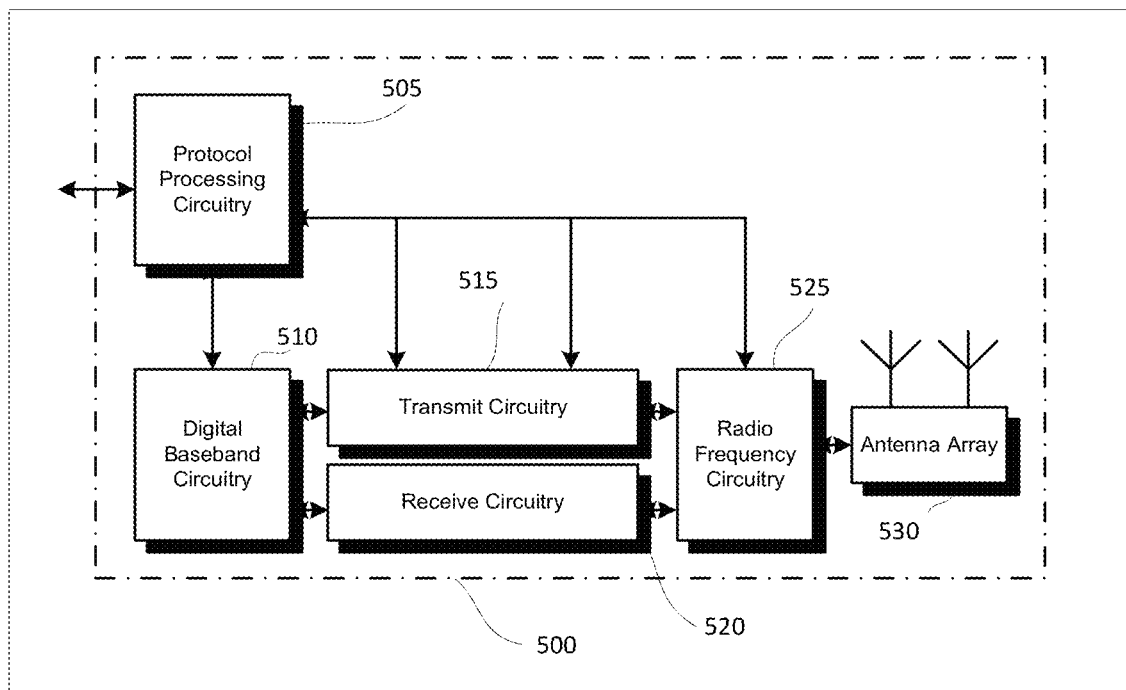
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
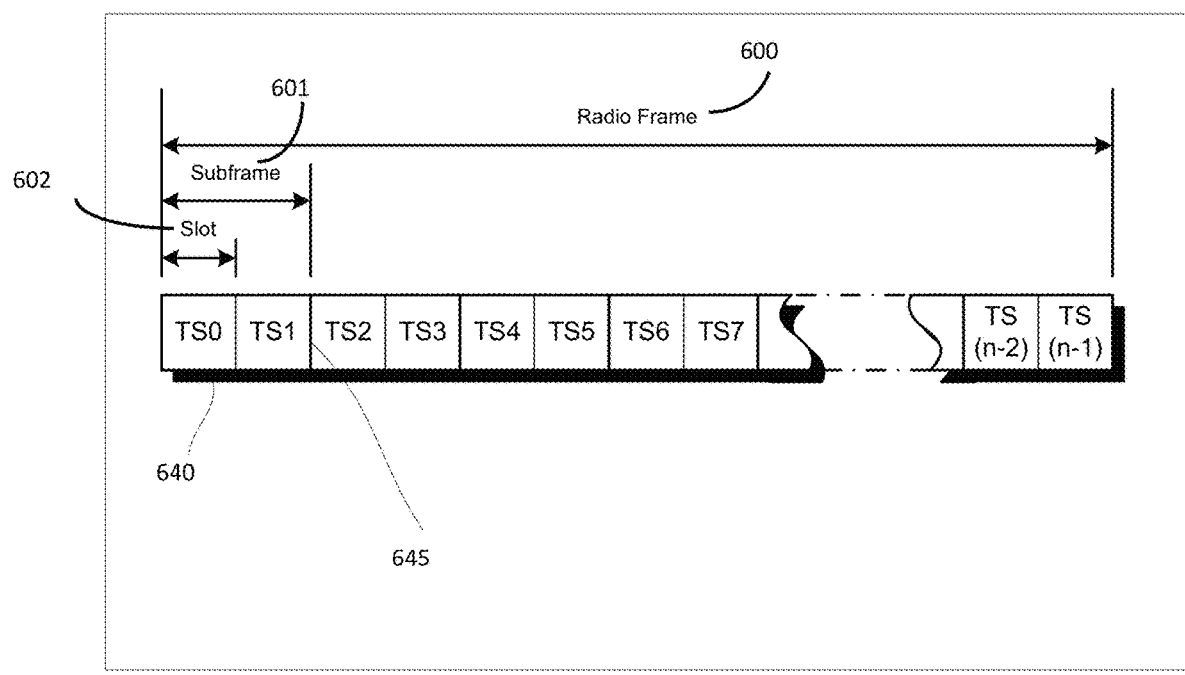
FIG. 6 illustrates an example of a radio frame structure in accordance with some embodiments.
Figures 7A, 7B:
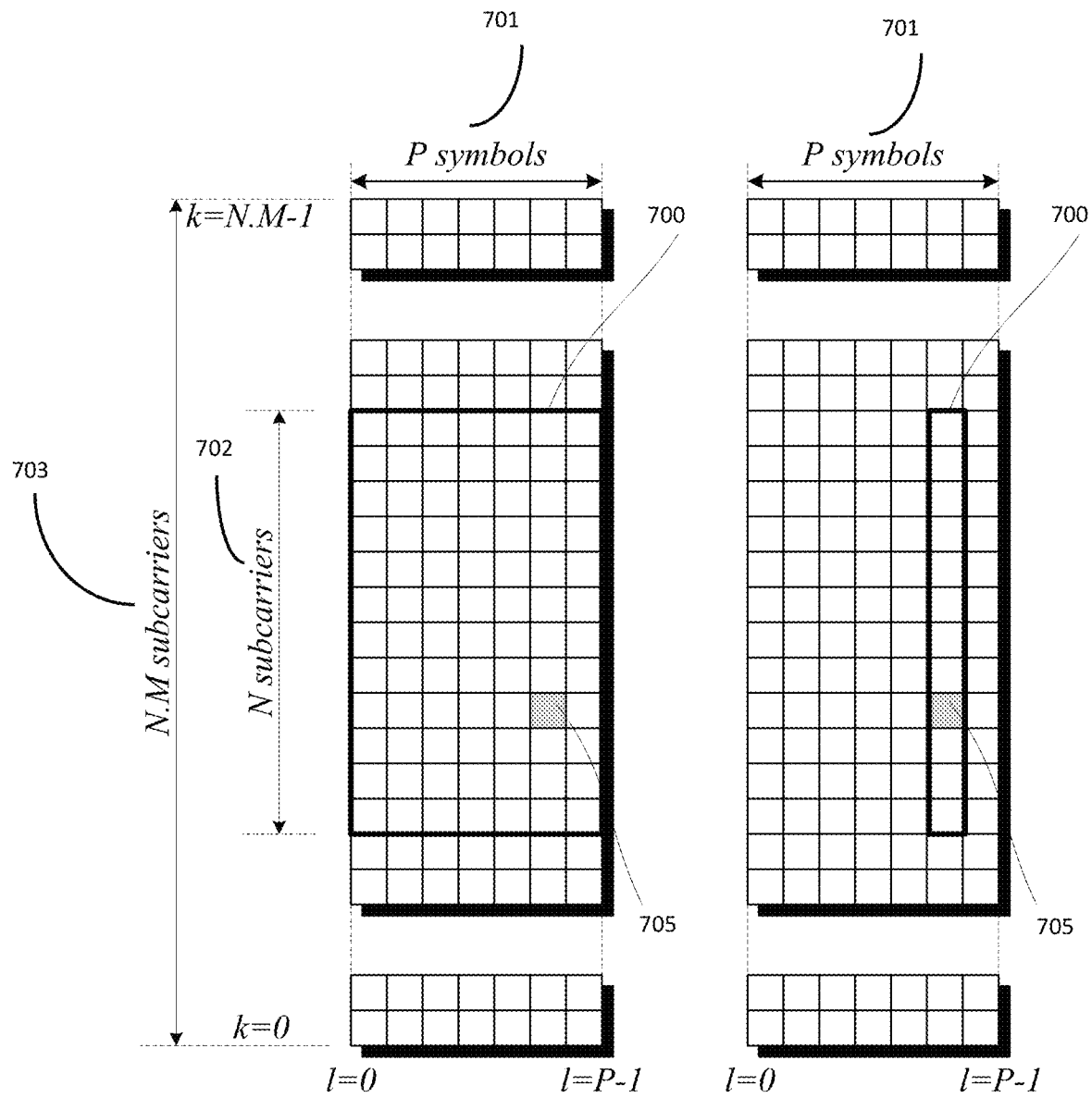
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, a UE 102 may receive, from a gNB 105, radio resource control (RRC) signaling that configures reception of a plurality of physical downlink shared channels (PDSCHs) in a frame. The frame may comprise multiple slots, including one or more downlink slots and one or more uplink slots. The RRC signaling may include a downlink aggregation factor that indicates a number of consecutive slots in which each of the PDSCHs is to be repeated. The RRC signaling may further include, for each of the PDSCHs, a hybrid automatic repeat request acknowledgement (HARQ-ACK) timing parameter that indicates a time difference between a starting slot of the PDSCH and an uplink slot in which the UE 102 is to transmit HARQ-ACK feedback in accordance with a HARQ-ACK codebook. The UE 102 may determine a subset of the PDSCHs, such that for each of the PDSCHs of the subset, corresponding consecutive slots do not overlap the uplink slots. The UE 102 may set a number of bits of the HARQ-ACK codebook equal to a number of PDSCHs in the determined subset. These embodiments are described in more detail below.

Figure 8:
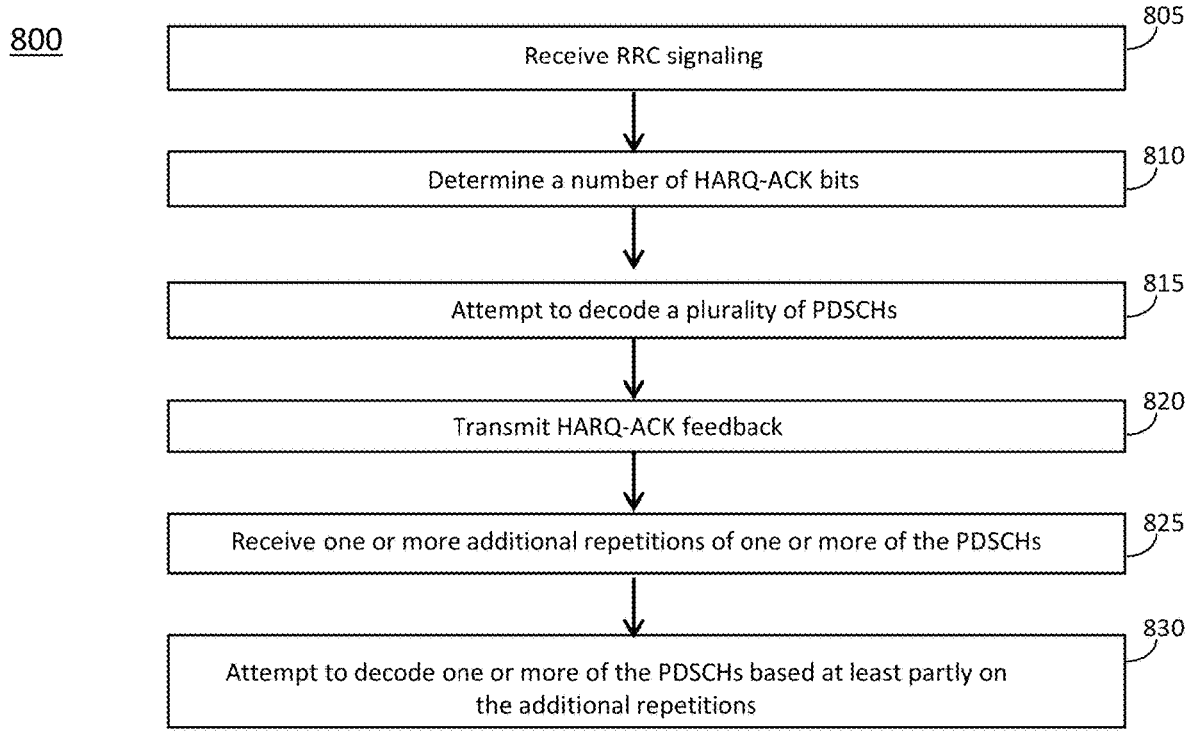
FIG. 8 illustrates the operation of a method of communication in accordance with some embodiments.
Figure 9:
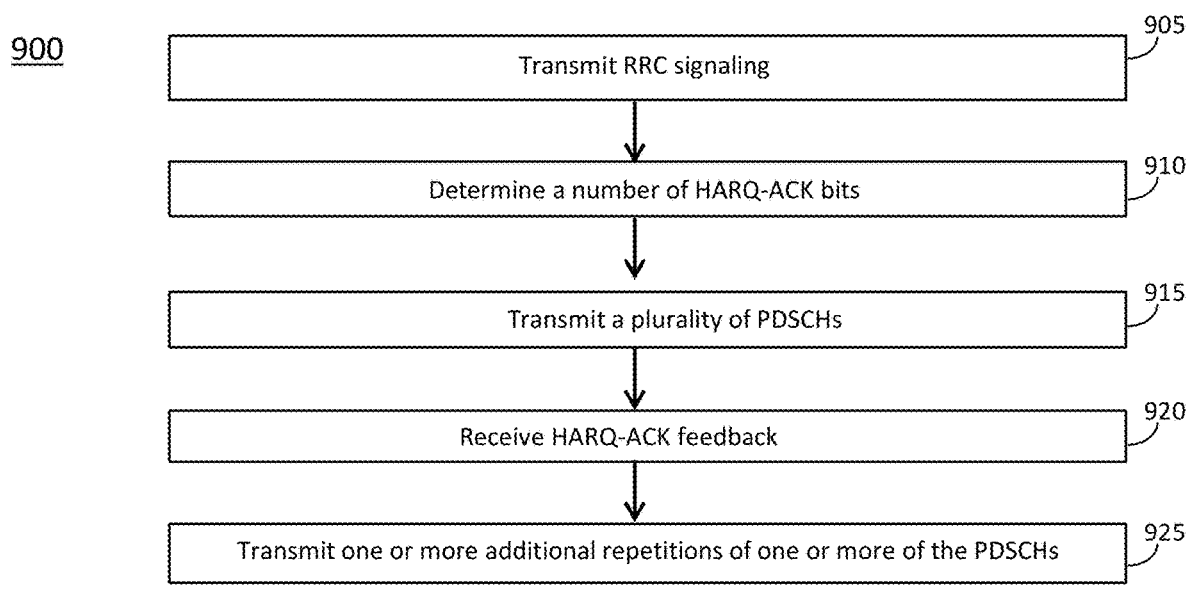
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to RRC signaling, HARQ, HARQ-ACK, HARQ-ACK feedback, HARQ-ACK codebook, downlink aggregation factor, HARQ-ACK timing parameter, techniques to determine a number of HARQ-ACK bits (such as in the HARQ-ACK codebook, HARQ-ACK feedback and/or other), techniques to determine a size of the HARQ-ACK codebook and/or the HARQ-ACK feedback, PDSCHs and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102 may be arranged to operate in accordance with an NR protocol. In some embodiments, the gNB 105 may be arranged to operate in accordance with an NR protocol.

At operation 805, the UE 102 may receive radio resource control (RRC) signaling. At operation 810, the UE 102 may determine a number of HARQ-ACK bits. At operation 815, the UE 102 may attempt to decode a plurality of PDSCHs. At operation 820, the UE 102 may transmit HARQ-ACK feedback. At operation 825, the UE 102 may receive one or more additional repetitions of one or more of the PDSCHs. At operation 830, the UE 102 may attempt to decode one or more of the PDSCHs based at least partly on the additional repetitions.

In some embodiments, the UE 102 may receive radio resource control (RRC) signaling that configures reception of a plurality of physical downlink shared channels (PDSCHs) in a frame. In some embodiments, the frame may comprise multiple slots. In some embodiments, the frame may comprise one or more downlink slots and one or more uplink slots. In some embodiments, the frame may comprise one or more downlink slots. In some embodiments, the frame may comprise one or more uplink slots. In some embodiments, the RRC signaling may indicate a time division duplexing (TDD) configuration that indicates an ordering of the downlink slots and the uplink slots within the frame.

In some embodiments, the RRC signaling may include a downlink aggregation factor. In some embodiments, the downlink aggregation factor may indicate a number of consecutive slots in which each of the PDSCHs is to be repeated, although the scope of embodiments is not limited in this respect. In some embodiments, one downlink aggregation factor may be used to indicate, for each of the PDSCHs, a number of consecutive slots for repetition. In some embodiments, multiple downlink aggregation factors may be used. For instance, for a PDSCH, a corresponding downlink aggregation factor for the PDSCH may indicate a number of repetitions for the PDSCH. In some embodiments in which multiple downlink aggregation factors are used, at least two of the downlink aggregation factors may be different.

In some embodiments, the RRC signaling may include, for each of the PDSCHs, a hybrid automatic repeat request acknowledgement (HARQ-ACK) timing parameter. In some embodiments, the HARQ-ACK timing parameter may indicate a time difference between a starting slot of the PDSCH and an uplink slot in which the UE 102 is to transmit HARQ-ACK feedback in accordance with a HARQ-ACK codebook, although the scope of embodiments is not limited in this respect. In a non-limiting example, the time differences between the starting slots of the PDSCH and the uplink slot in which the UE 102 is to transmit the HARQ-ACK feedback may be in terms of a number of slots. Other units (in addition to or instead of the number of slots) may be used, in some embodiments.

In some embodiments, the UE 102 may determine a subset of the PDSCHs, such that for each of the PDSCHs of the subset, corresponding consecutive slots do not overlap the uplink slots. The UE 102 may set a number of bits of the HARQ-ACK codebook equal to a number of PDSCHs in the determined subset.

In some embodiments, the UE 102 may determine the subset of the PDSCHs, such that for any two PDSCHs of the subset, the corresponding consecutive slots of one of the PDSCHs do not overlap with the corresponding consecutive slots of the other of the PDSCHs. The UE 102 may set the number of bits of the HARQ-ACK codebook equal to a number of PDSCHs in the determined subset.

In some embodiments, the UE 102 may determine a subset of the PDSCHs, such that: for each of the PDSCHs of the subset, corresponding consecutive slots do not overlap the uplink slots; and for any two PDSCHs of the subset, the corresponding consecutive slots of one of the PDSCHs do not overlap with the corresponding consecutive slots of the other of the PDSCHs. The UE 102 may set the number of bits of the HARQ-ACK codebook equal to a number of PDSCHs in the determined subset.

In some embodiments, to determine a second subset, the UE 102 may determine a first subset of the plurality of PDSCHs, wherein the UE 102 may determine the first subset by exclusion, from the plurality of PDSCHs, of the PDSCHs for which at least one of the corresponding consecutive slots overlaps with one of the uplink time slots. The UE 102 may determine the second subset as one or more PDSCHs of the first subset, wherein the consecutive slots corresponding to the PDSCHs of the second subset are non-overlapping. The UE 102 may set the number of bits of the HARQ-ACK codebook equal to a number of PDSCHs in the determined second subset.

In some embodiments, the UE 102 may initialize a first subset of the plurality of PDSCHs to the plurality of PDSCHs. The UE 102 may initialize a second subset to an empty set. The UE 102 may perform one or more of: select, from the first subset, the PDSCH for which a corresponding HARQ-ACK timing value is lowest; add the selected PDSCH to the second subset; exclude the selected PDSCH from the first subset; and exclude, from the first subset, any PDSCH of the first subset for which at least one corresponding consecutive slots overlaps the consecutive slots corresponding to the selected PDSCH. The UE 102 may set the number of bits of the HARQ-ACK codebook equal to a number of PDSCHs in the determined second subset.

In some of the above embodiments, the UE 102 may repeat, until the first subset is an empty set: selection, from the first subset, of the PDSCH for which a corresponding HARQ-ACK timing value is lowest; addition of the selected PDSCH to the second subset; exclusion of the selected PDSCH from the first subset; and exclusion, from the first subset, of any PDSCH of the first subset for which at least one corresponding consecutive slots overlaps the consecutive slots corresponding to the selected PDSCH. The UE 102 may set the number of bits of the HARQ-ACK codebook equal to a number of PDSCHs in the determined second subset.

In some embodiments, for first consecutive slots corresponding to a first PDSCH and second consecutive slots corresponding to a second PDSCH, if at least one of the first consecutive slots overlaps one of the second consecutive slots, the UE 102 may determine a subset of the PDSCHs to exclude either or both of the first and second PDSCHs. The UE 102 may set the number of bits of the HARQ-ACK codebook equal to a number of PDSCHs in the determined subset.

In some embodiments, for two PDSCHs for which corresponding consecutive slots at least partly overlap, the UE 102 may exclude at least one of the PDSCHs from a subset of the PDSCHs. The UE 102 may set the number of bits of the HARQ-ACK codebook equal to a number of PDSCHs in the determined subset.

In some embodiments, the UE 102 may attempt to decode the plurality of PDSCHs. The UE 102 may encode each of the bits of the HARQ-ACK feedback to indicate successful decoding or unsuccessful decoding of one or more of the PDSCHs of the plurality of PDSCHs.

In some embodiments, the UE 102 may attempt to decode the plurality of PDSCHs. The UE 102 may encode each of the bits of the HARQ-ACK feedback to indicate whether at least one of the PDSCHs corresponding to the bit of the HARQ-ACK feedback is not successfully decoded.

In some embodiments, the UE 102 may attempt to decode the plurality of PDSCHs. The UE 102 may encode the HARQ-ACK feedback to indicate successful decoding or unsuccessful decoding of one or more of the PDSCHs.

In some embodiments, if one or more of the PDSCHs are not successfully decoded, the UE 102 may attempt to decode the PDSCHs that are not successfully decoded further based on one or more additional repetitions of the PDSCHs received in response to the HARQ-ACK feedback.

In some embodiments, the UE 102 may encode the HARQ-ACK feedback to indicate successful decoding or unsuccessful decoding of one or more of the PDSCHs. The UE 102 may encode the HARQ-ACK feedback for transmission in one of the uplink slots.

In some embodiments, the UE 102 may receive, from the gNB 105, RRC signaling that configures reception of a plurality of PDSCHs in a frame, wherein the frame comprises multiple slots, including one or more downlink slots and one or more uplink slots. The UE 102 may decode the PDSCHs, wherein each PDSCH is received in a plurality of consecutive slots. The UE 102 may determine a number of bits of a HARQ-ACK codebook, wherein the UE 102 may: determine a first subset of the plurality of PDSCHs by exclusion, from the plurality of PDSCHs, of the PDSCHs for which at least one of the corresponding consecutive slots overlaps with one of the uplink time slots; determine a second subset of the plurality of PDSCHs to include one or more PDSCHs of the first subset, wherein the consecutive slots corresponding to the PDSCHs of the second subset are non-overlapping; and set the number of bits of the HARQ-ACK codebook equal to a number of PDSCHs in the second subset.

In some embodiments, the UE 102 may encode HARQ-ACK feedback for transmission to the gNB 105. The HARQ-ACK feedback may be encoded in accordance with the HARQ-ACK codebook. The UE 102 may, if the HARQ-ACK feedback indicates unsuccessful reception of one or more of the PDSCHs: decode one or more additional repetitions of the PDSCHs for which unsuccessful reception is indicated by the HARQ-ACK feedback.

In some embodiments, an apparatus of a UE 102 may comprise memory. The memory may be configurable to store at least a portion of the RRC signaling. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the RRC signaling. The apparatus may include a transceiver to receive the RRC signaling. The transceiver may transmit and/or receive other blocks, messages and/or other elements.

At operation 905, the gNB 105 may transmit RRC signaling. At operation 910, the gNB 105 may determine a number of HARQ-ACK bits. At operation 915, the gNB 105 may transmit a plurality of PDSCHs. At operation 920, the gNB 105 may receive HARQ-ACK feedback. At operation 925, the gNB 105 may transmit one or more additional repetitions of one or more of the PDSCHs.

In some embodiments, the gNB 105 may transmit RRC signaling that configures reception of a plurality of PDSCHs in a frame. In some embodiments, the gNB 105 may transmit RRC signaling that configures reception of a plurality of PDSCHs by the UE 102 in a frame. In some embodiments, the gNB 105 may transmit the RRC signaling to the UE 102, although the scope of embodiments is not limited in this respect.

In some embodiments, the frame may comprise multiple slots. In some embodiments, the frame may include one or more of: one or more downlink slots; and one or more uplink slots.

In some embodiments, the gNB 105 may encode the PDSCHs for transmission, each PDSCH encoded in a plurality of consecutive slots.

In some embodiments, the gNB 105 may determine a number of bits of a HARQ-ACK codebook, the HARQ-ACK codebook for HARQ-ACK feedback that is to be received from the UE 102. The gNB 105 may determine a first subset of the plurality of PDSCHs by exclusion, from the plurality of PDSCHs, of the PDSCHs for which at least one of the corresponding consecutive slots overlaps with one of the uplink time slots. The gNB 105 may determine a second subset of the plurality of PDSCHs to include one or more PDSCHs of the first subset, wherein the consecutive slots corresponding to the PDSCHs of the second subset are non-overlapping. The gNB 105 may set the number of bits of the HARQ-ACK codebook equal to a number of PDSCHs in the second subset.

In some embodiments, the gNB 105 may decode the HARQ-ACK feedback, wherein the HARQ-ACK feedback is received from the UE 102. If the HARQ-ACK feedback indicates unsuccessful reception of one or more of the PDSCHs, the gNB 105 may encode, for transmission, one or more additional repetitions of the PDSCHs for which unsuccessful reception is indicated by the HARQ-ACK feedback.

In some embodiments, the gNB 105 may encode the RRC signaling to include one or more of: a downlink aggregation factor; a HARQ-ACK timing value; and/or other. In some embodiments, the downlink aggregation factor may indicate a number of consecutive slots in which each of the plurality of PDSCHs is to be repeated, although the scope of embodiments is not limited in this respect. In some embodiments, the RRC signaling may be encoded to include a HARQ-ACK timing value for each of the plurality of PDSCHs, although the scope of embodiments is not limited in this respect. In some embodiments, the HARQ-ACK for a PDSCH may indicate a time difference between a starting slot of the PDSCH and an uplink slot in which the UE 102 is to transmit the HARQ-ACK feedback.

In some embodiments, an apparatus of a gNB 105 may comprise memory. The memory may be configurable to store at least a portion of the RRC signaling. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the RRC signaling. The apparatus may include a transceiver to transmit the RRC signaling. The transceiver may transmit and/or receive other blocks, messages and/or other elements.

Figure 10:
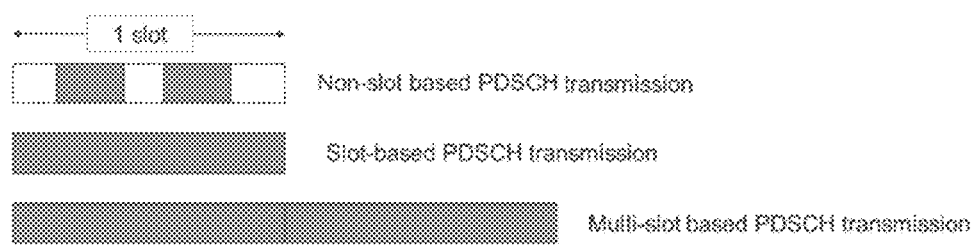
FIG. 10 illustrates example physical downlink shared channel (PDSCH) transmissions in accordance with some embodiments.
Figure 13:
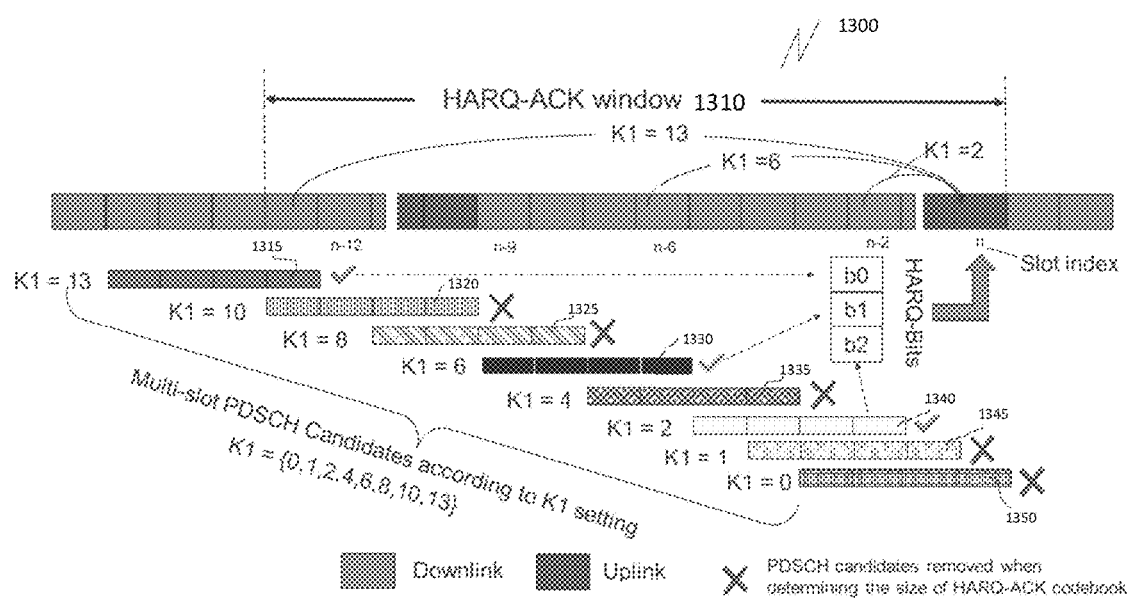
FIG. 13 illustrates an example hybrid automatic repeat request (HARD) technique in accordance with some embodiments.

FIG. 10 illustrates example physical downlink shared channel (PDSCH) transmissions in accordance with some embodiments. FIG. 11 illustrates example operations in accordance with some embodiments. FIG. 12 illustrates example operations in accordance with some embodiments. FIG. 13 illustrates an example hybrid automatic repeat request (HARD) technique in accordance with some embodiments. It should be noted that the examples shown in FIGS. 10-13 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-13. Although some of the elements shown in the examples of FIGS. 10-13 may be included in a 3GPP standard, 3GPP LTE standard, NR standard, 5G standard and/or other standard, embodiments are not limited to usage of such elements that are included in standards.

NR supports a variety of PDSCH transmission schemes, including non-slot based scheduling, slot-based and multi-slot transmission. When a UE 102 is configured with X>1 (i.e. multi-slot DL transmission, X denotes the value of aggregationFactorDL), the same symbol allocation is applied across X consecutive slots. A same TB is repeated within each symbol allocation among each of the aggregationFactorDL consecutive slots and the PDSCH is limited to a single transmission layer. In FIG. 10, example PDSCH transmissions that may be supported in NR systems are illustrated.

Two types of HARQ-ACK codebooks may be defined for NR PDSCH transmissions: one may be named type-1 HARQ-ACK codebook and another may be named type 2 HARQ-ACK codebook. For the type 1 HARQ-ACK codebook, the number of HARQ-ACK bits may be determined based on a list of parameters, including K1 values, CC numbers, non-overlapped PDSCH per slot, number of CBGs per CC and/or other(s). In some cases of multi-slot transmissions, usage of some designs may result in redundant HARQ-ACK bits and may cause unnecessary UL signaling overhead.

In some embodiments, one or more methods to determine the HARQ-ACK codebook for multi-slot PDSCH transmission in NR may be used. In some embodiments, a size of the HARQ-ACK codebook may be determined at least based on the PDSCH-to-HARQ timing K1 values and the value of aggregation factor configured by higher layers. In some embodiments, one or more methods to handle the non-detected PDSCH occasions for semi-static HARQ-ACK codebook may be used.

In some embodiments, techniques for determining the number of HARQ-ACK bits for data transmissions in a NR system may be used. The number of HARQ-ACK bits for acknowledging a data transmission may be determined in different manners depending on the availability of certain information. The number of bits, in turn, may be used to control the transmission of HARQ-ACK information.

In some embodiments, one HARQ-ACK bit would be generated for each TB in each multi-slots PDSCH transmission. This approach is rather simple but it also results in huge amount of redundant HARQ-ACK bits and unnecessary UL signaling overhead. The overhead becomes more sever when CBG-based retransmissions and CA are configured for the said UE 102.

In some embodiments, the number of HARQ-ACK bits in a PUCCH or PUSCH in slot n is determined at least based on the following information: on a set of slot timing values $K_1$ associated with the active uplink bandwidth part (BWP), which is configured by higher layers; a set of row indexes of a table provided by higher layers associated with the active DL BWP defining the respective sets of slot offsets $K_0$, start and length indicator SLIV and PDSCH mapping types; the value of aggregationFactor for DL, which indicates the number of repetitions for PDSCH transmissions; and TDD UL/DL configurations by higher layers.

In some embodiments, for HARQ-ACK feedback for the case of aggregationFactor>1 (i.e. multi-slots transmission), the UE 102 determines $M_{A,C}$ occasions for candidate PDSCH receptions with multi-slot transmissions according to the pseudo-code 1100 in FIG. 11. Some embodiments may not necessarily include all elements described in the pseudo-code 1100 in FIG. 11. Some embodiments may include one or more additional elements not described in the pseudo-code 1100 in FIG. 11. Some embodiments may include one or more elements that are similar to one or more elements described in the pseudo-code 1100 in FIG. 11. Some embodiments may include one or more alternate elements for one or more elements described in the pseudo-code 1100 in FIG. 11. In the pseudo-code 1100 in FIG. 11, the PDSCH candidate selection was conducted starting from the candidate with largest last slot index as determined by the K1 value.

In some embodiments, the PDSCH candidates may be selected starting from the candidate with a smallest last slot index as determined by the K1 value. Example pseudo-code 1200 is shown in FIG. 12.

In some of the embodiments described above, the multi-slot PDSCH candidates associated with a single UL slot for HARQ-ACK feedback are removed from the type 1 HARQ-ACK codebook as long as at least one symbol was overlapped between two candidates. Hence, the size of HARQ-ACK codebook is reduced without any DL performance loss. In addition, the candidates with at least one UL symbol in accordance to the semi-static TDD UL/DL configuration provided by higher layer, or having at least one DL slot before BWP switching are also excluded to simplify the design and reduce UL control overhead.

FIG. 13, illustrates determination of the HARQ-ACK bits for multi-slot PDSCH transmission in accordance with some embodiments. FIG. 13 illustrates a proposed HARQ-ACK determination method 1300 for PDSCH with multiple slot transmissions. As shown, the UE 102 is configured with a set of K1 values i.e. <0, 1, 2, 4, 6, 8, 10, 13> by higher layers and correspondingly determine to feedback HARQ-ACK for PDSCH transmission within a HARQ-ACK window 1310 in the UL slot index n. In addition, multi-slot PDSCH transmission is assumed for the said UE 102 with aggregation factor being equal to 4. As illustrated in FIG. 13, there may be some overlapped between the multi-slot PDSCH candidates pairs and not possible to be scheduled simultaneously for a given UE on both of them. These overlapped candidates include pairs of PDSCH candidates <1315, 1320>, <1320, 1325>, <1325, 1330>, <1330, 1335>, <1335, 1340, 1345>, <1340, 1345, 1350>. With the method 1300, PDSCH candidate 1320, 1325, 1345 and 1350 is first dropped for the size determination of HARQ-ACK bits due to the rule that at least one slot within them is configured as UL subject to TDD UL-DL configurations provided by higher layers. Then, the multi-slot PDSCH candidate 1340 is first selected as one valid candidate. Correspondingly, the candidate 1335 needs to be omitted for the size determination of HARQ-ACK bits because of the overlapping between candidate 1340 and 1335 in the pair <1335, 1340, 1345>. Similarly, PDSCH candidates 1330 and 1315 are also selected. The HARQ-ACK generation method 1300 of FIG. 13 reduces the HARQ-ACK payload from 13 to 3 bits and offers 76% UL control signaling overhead reduction.

In some embodiments, the UE 102 may report ACK/NACK state for a PDSCH occasion only in the HARQ-ACK codebook transmitted in the UL slot indicated by the PDSCH-to-HARQ timing field in the corresponding DCI format. But, UE 102 generates a NACK/DTX value for the PDSCH reception occasions in UL slot j if it is within the HARQ-ACK window of slot j based on the K1 values but no PDSCH reception is actually received at the UE 102.

In some embodiments, the size of type 1 HARQ-ACK codebook is at least determined based on slot offset K0 and PDCCH monitoring occasions, which are separately configured by higher layers for a given UE 102. More specifically, in some designs, if multiple slot offset K0 values are configured, the UE shall not generate HARQ-ACK bit in slot n for PDSCH candidate in slot $n-K_1$ if the associated PDCCH occasion in the slot $n-K_1-K_0$ is uplink or no PDCCH search space is configured in the slot $n-K_1-K_0$.

In some embodiments, a method for determination of HARQ-ACK codebook size in a radio communication may comprise identifying the value of DL aggregation factor and PDSCH-to-HARQ-ACK timing K1 values. In some embodiments, the method may comprise determining the PDSCH candidates at least based on the identified aggregation factor value and the K1 values. In some embodiments, the value of DL aggregation factor and/or PDSCH-to-HARQ-ACK timing K1 values may be configured by higher layers. In some embodiments, the method may comprise determining the HARQ-ACK codebook based on the TDD UL/DL configurations by higher layers and the BWP switching time instance.

In some embodiments, the method may comprise: when determining the size of HARQ-ACK bits number that is transmitted in UL slot n, the slot $(n-K_{1,k})$ is removed from the set of K1 configured by higher layers if slot n is after a slot for an active DL BWP change on serving cell c or an active UL BWP change on the PCell and any slot with the set from slot $(n-K_{1,k}-(F-1))$ to slot $(n-K_{1,k})$ is before the slot for the active DL BWP change on serving cell c or the active UL BWP change on the PCell.

In some embodiments, the method may comprise: when determining the size of HARQ-ACK bits number that is transmitted in UL slot n, the slot $(n-K_{1,k})$ is removed from the set of K1 configured by higher layers if the UE 102 is provided by higher layer TDD semi-static UL-DL configuration parameter and for slot sets from slot $(n-K_{1,k}-(F-1))$ to slot $(n-K_{1,k})$ at least one OFDM symbol of the PDSCH time resource derived is configured as UL.

In some embodiments, the method may comprise: (operation #1) selecting the PDSCH candidate with smallest K1 value in the K1 values configured by higher layers; (operation #2) removing the PDSCH candidates that has at least one slot overlapped with the selected PDSCH candidate; and (operation 3) iterating operation #1 and operation #2 until all K1 values in the set are searched.

In some embodiments, the method may comprise determining the HARQ-ACK size to be the number of selected PDSCH candidates without overlapping. In some embodiments, the UE 102 may report ACK/NACK state for a PDSCH occasion only in the HARQ-ACK codebook transmitted in the UL slot indicated by the PDSCH-to-HARQ timing field in the corresponding DCI format. In some embodiments, the UE 102 may generate a NACK/DTX value for the PDSCH reception occasions in UL slot j if it is within the HARQ-ACK window of slot j based on the K1 values but no PDSCH reception is actually received at the UE 102.

In some embodiments, one HARQ-ACK bit may be generated for each TB in each PDSCH in case of multi-slots transmission.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising:
    memory; and processing circuitry, configured to:
        decode, from a Next Generation Node-B (gNB), radio resource control (RRC) signaling that configures reception of a plurality of physical downlink shared channels (PDSCHs) in a frame, wherein the frame comprises multiple slots, including one or more downlink slots and one or more uplink slots, wherein the RRC signaling includes a downlink aggregation factor that indicates a number of consecutive slots in which each of the PDSCHs is to be repeated, wherein the RRC signaling further includes, for each of the PDSCHs, a hybrid automatic repeat request acknowledgement (HARQ-ACK) timing parameter that indicates a time difference between a starting slot of the PDSCH and an uplink slot in which the UE is to transmit HARQ-ACK feedback in accordance with a HARQ-ACK codebook;

determine a subset of the PDSCHs, such that for each of the PDSCHs of the subset, corresponding consecutive slots do not overlap the uplink slots; and set a number of bits of the HARQ-ACK codebook equal to a number of PDSCHs in the determined subset, wherein the memory is configured to store at least a portion of the RRC signaling.

2. The apparatus according to claim 1, the processing circuitry further configured to:
determine the subset of the PDSCHs, such that for any two PDSCHs of the subset, the corresponding consecutive slots of one of the PDSCHs do not overlap with the corresponding consecutive slots of the other of the PDSCHs.

3. The apparatus according to claim 1, wherein:
the subset is a second subset,
to determine the second subset, the processing circuitry is configured to:
determine a first subset of the plurality of PDSCHs, wherein the processing circuitry is configured to determine the first subset by exclusion, from the plurality of PDSCHs, of the PDSCHs for which at least one of the corresponding consecutive slots overlaps with one of the uplink time slots; and
determine the second subset as one or more PDSCHs of the first subset, wherein the consecutive slots corresponding to the PDSCHs of the second subset are non-overlapping.

4. The apparatus according to claim 1, the processing circuitry further configured to:
attempt to decode the plurality of PDSCHs; and
encode each of the bits of the HARQ-ACK feedback to indicate successful decoding or unsuccessful decoding of one or more of the PDSCHs of the plurality of PDSCHs.

5. The apparatus according to claim 1, the processing circuitry further configured to:
attempt to decode the plurality of PDSCHs; and
encode each of the bits of the HARQ-ACK feedback to indicate whether at least one of the PDSCHs corresponding to the bit of the HARQ-ACK feedback is not successfully decoded.

6. The apparatus according to claim 1, wherein the RRC signaling further indicates a time division duplexing (TDD) configuration that indicates an ordering of the downlink slots and the uplink slots within the frame.

7. The apparatus according to claim 1, wherein the time differences between the starting slots of the PDSCH and the uplink slot in which the UE is to transmit the HARQ-ACK feedback are in terms of a number of slots.

8. The apparatus according to claim 1, wherein:
the subset is a second set,
the processing circuitry is further configured to:
initialize a first subset of the plurality of PDSCHs to the plurality of PDSCHs;
initialize the second subset to an empty set;
select, from the first subset, the PDSCH for which a corresponding HARQ-ACK timing value is lowest;
add the selected PDSCH to the second subset;
exclude the selected PDSCH from the first subset; and
exclude, from the first subset, any PDSCH of the first subset for which at least one corresponding consecutive slots overlaps the consecutive slots corresponding to the selected PDSCH.

9. The apparatus according to claim 8, the processing circuitry further configured to:
repeat, until the first subset is an empty set:
selection, from the first subset, of the PDSCH for which a corresponding HARQ-ACK timing value is lowest;
addition of the selected PDSCH to the second subset;
exclusion of the selected PDSCH from the first subset; and
exclusion, from the first subset, of any PDSCH of the first subset for which at least one corresponding consecutive slots overlaps the consecutive slots corresponding to the selected PDSCH.

10. The apparatus according to claim 1, wherein:
for first consecutive slots corresponding to a first PDSCH and second consecutive slots corresponding to a second PDSCH, if at least one of the first consecutive slots overlaps one of the second consecutive slots:
the processing circuitry is configured to determine the subset to exclude either or both of the first and second PDSCHs.

11. The apparatus according to claim 1, the processing circuitry further configured to:
for two PDSCHs for which corresponding consecutive slots at least partly overlap, exclude at least one of the PDSCHs from the subset.

12. The apparatus according to claim 1, the processing circuitry further configured to:
attempt to decode the plurality of PDSCHs;
encode the HARQ-ACK feedback to indicate successful decoding or unsuccessful decoding of one or more of the PDSCHs; and
if one or more of the PDSCHs are not successfully decoded, attempt to decode the PDSCHs that are not successfully decoded further based on one or more additional repetitions of the PDSCHs received in response to the HARQ-ACK feedback.

13. The apparatus according to claim 1, the processing circuitry further configured to:
encode the HARQ-ACK feedback to indicate successful decoding or unsuccessful decoding of one or more of the PDSCHs; and
encode the HARQ-ACK feedback for transmission in one of the uplink slots.

14. The apparatus according to claim 1, wherein the UE is arranged to operate in accordance with a new radio (NR) protocol.

15. The apparatus according to claim 1, wherein:
the apparatus includes a transceiver to receive the RRC signaling,
the processing circuitry includes a baseband processor to decode the RRC signaling.

16. A non-transitory computer-readable storage medium that stores instructions for execution by processing circuitry of a Next Generation Node-B (gNB), the operations to configure the processing circuitry to:

encode, for transmission to a User Equipment (UE), radio resource control (RRC) signaling that configures reception of a plurality of physical downlink shared channels (PDSCHs) in a frame, wherein the frame comprises multiple slots, including one or more downlink slots and one or more uplink slots;

encode the PDSCHs for transmission, each PDSCH encoded in a plurality of consecutive slots;

determine a number of bits of a hybrid automatic repeat request acknowledgement (HARQ-ACK) codebook, the HARQ-ACK codebook for HARQ-ACK feedback that is to be received from the UE, wherein the operations configure the processing circuitry to:

determine a first subset of the plurality of PDSCHs by exclusion, from the plurality of PDSCHs, of the PDSCHs for which at least one of the corresponding consecutive slots overlaps with one of the uplink time slots;

determine a second subset of the plurality of PDSCHs to include one or more PDSCHs of the first subset, wherein the consecutive slots corresponding to the PDSCHs of the second subset are non-overlapping; and set the number of bits of the HARQ-ACK codebook equal to a number of PDSCHs in the second subset.

17. The non-transitory computer-readable storage medium according to claim 16, the operations to further configure the processing circuitry to:

decode the HARQ-ACK feedback, wherein the HARQ-ACK feedback is received from the UE; and if the HARQ-ACK feedback indicates unsuccessful reception of one or more of the PDSCHs:

encode, for transmission, one or more additional repetitions of the PDSCHs for which unsuccessful reception is indicated by the HARQ-ACK feedback.

18. The non-transitory computer-readable storage medium according to claim 16, the operations to configure the processing circuitry to:

encode the RRC signaling to include a downlink aggregation factor that indicates a number of consecutive slots in which each of the plurality of PDSCHs is to be repeated; and encode the RRC signaling to further include, for each of the plurality of PDSCHs, a hybrid automatic repeat request acknowledgement (HARQ-ACK) timing value that indicates a time difference between a starting slot of the PDSCH and an uplink slot in which the UE is to transmit the HARQ-ACK feedback.

19. An apparatus of a User Equipment (UE), the apparatus comprising:

memory; and processing circuitry, configured to:

decode, from a Next Generation Node-B (gNB), radio resource control (RRC) signaling that configures reception of a plurality of physical downlink shared channels (PDSCHs) in a frame, wherein the frame comprises multiple slots, including one or more downlink slots and one or more uplink slots;

decode the PDSCHs, wherein each PDSCH is received in a plurality of consecutive slots;

determine a number of bits of a hybrid automatic repeat request acknowledgement (HARQ-ACK) codebook, wherein the operations configure the processing circuitry to:

determine a first subset of the plurality of PDSCHs by exclusion, from the plurality of PDSCHs, of the PDSCHs for which at least one of the corresponding consecutive slots overlaps with one of the uplink time slots;

determine a second subset of the plurality of PDSCHs to include one or more PDSCHs of the first subset, wherein the consecutive slots corresponding to the PDSCHs of the second subset are non-overlapping; and set the number of bits of the HARQ-ACK codebook equal to a number of PDSCHs in the second subset.

20. The apparatus according to claim 19, the processing circuitry further configured to:

encode HARQ-ACK feedback for transmission to the gNB, the HARQ-ACK feedback encoded in accordance with the HARQ-ACK codebook; and if the HARQ-ACK feedback indicates unsuccessful reception of one or more of the PDSCHs:

decode one or more additional repetitions of the PDSCHs for which unsuccessful reception is indicated by the HARQ-ACK feedback.

* * * * *